United States Patent [19]

Bormioli

[11] 4,306,739
[45] Dec. 22, 1981

[54] QUICK-RELEASE CONNECTING DEVICE FOR FLANGED HYDRAULIC COMPONENTS

[76] Inventor: Giorgio Bormioli, Via Galileo Galilei 21, Padova, Italy

[21] Appl. No.: 109,895

[22] Filed: Jan. 7, 1980

[30] Foreign Application Priority Data

Jan. 8, 1979 [IT] Italy .............................. 19126 A/79

[51] Int. Cl.³ .......................................... F16L 23/00
[52] U.S. Cl. .................................... 285/18; 285/365; 285/409
[58] Field of Search ................... 285/18, 84, 365, 409, 285/408, 407; 24/273, 270

[56] References Cited

U.S. PATENT DOCUMENTS

| | | | |
|---|---|---|---|
| 2,981,187 | 4/1961 | Riordan et al. | 285/365 X |
| 3,157,932 | 11/1964 | Kyrias | 285/365 X |
| 3,442,535 | 5/1969 | Frohlich | 285/364 X |
| 3,489,434 | 1/1970 | Haley | 285/364 X |
| 4,222,591 | 9/1980 | Haley | 285/18 |

FOREIGN PATENT DOCUMENTS

| | | | |
|---|---|---|---|
| 2845167 | 4/1979 | Fed. Rep. of Germany | 285/365 |
| 1472750 | 5/1977 | United Kingdom | 285/409 |

Primary Examiner—Thomas F. Callaghan
Attorney, Agent, or Firm—Shlesinger, Fitzsimmons & Shlesinger

[57] ABSTRACT

A quick-release connection device is provided for flanged hydraulic components, which is able to operate with complete reliability both at ambient temperature and at very low temperature, and in the presence of ice.

3 Claims, 4 Drawing Figures

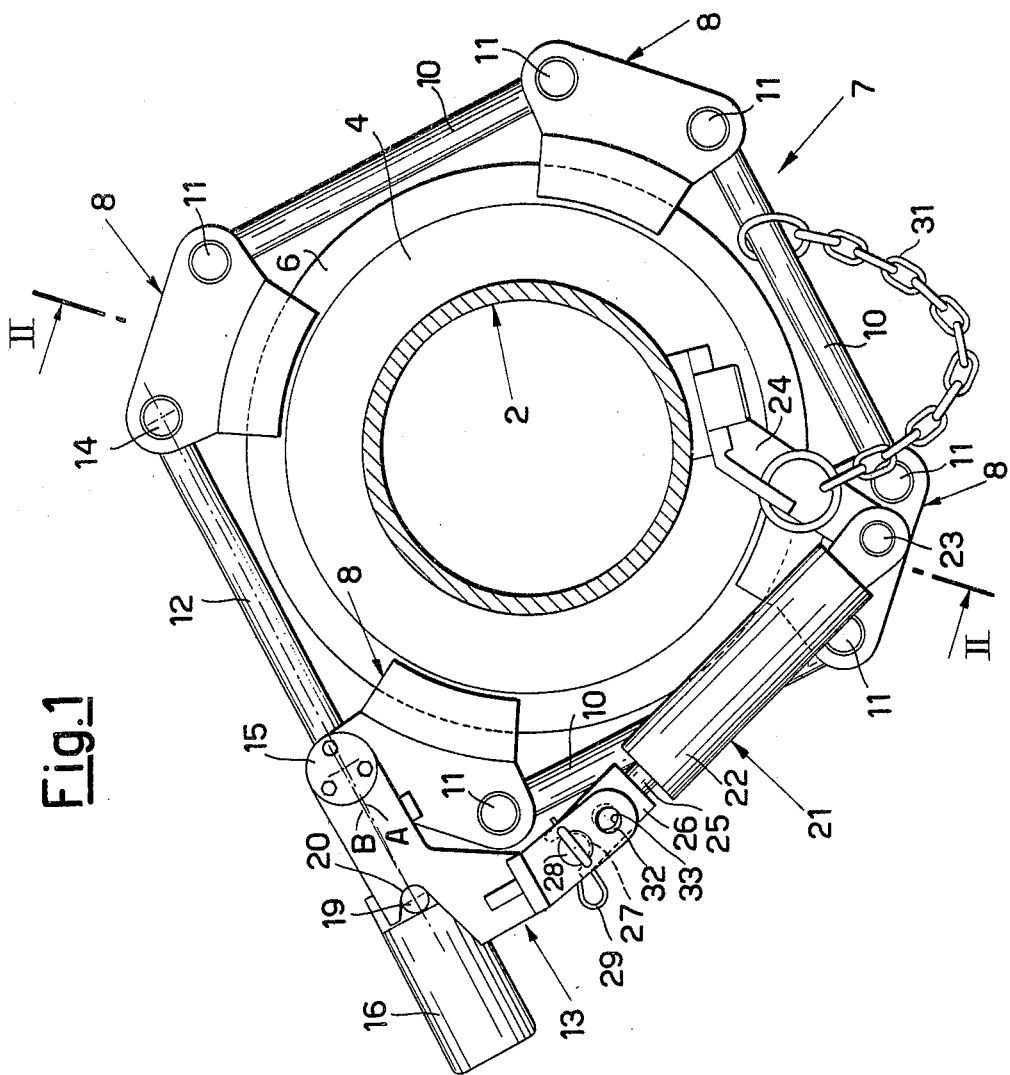
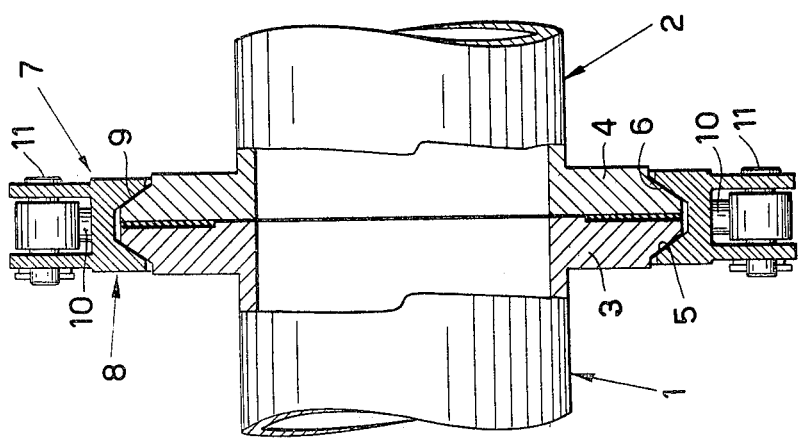

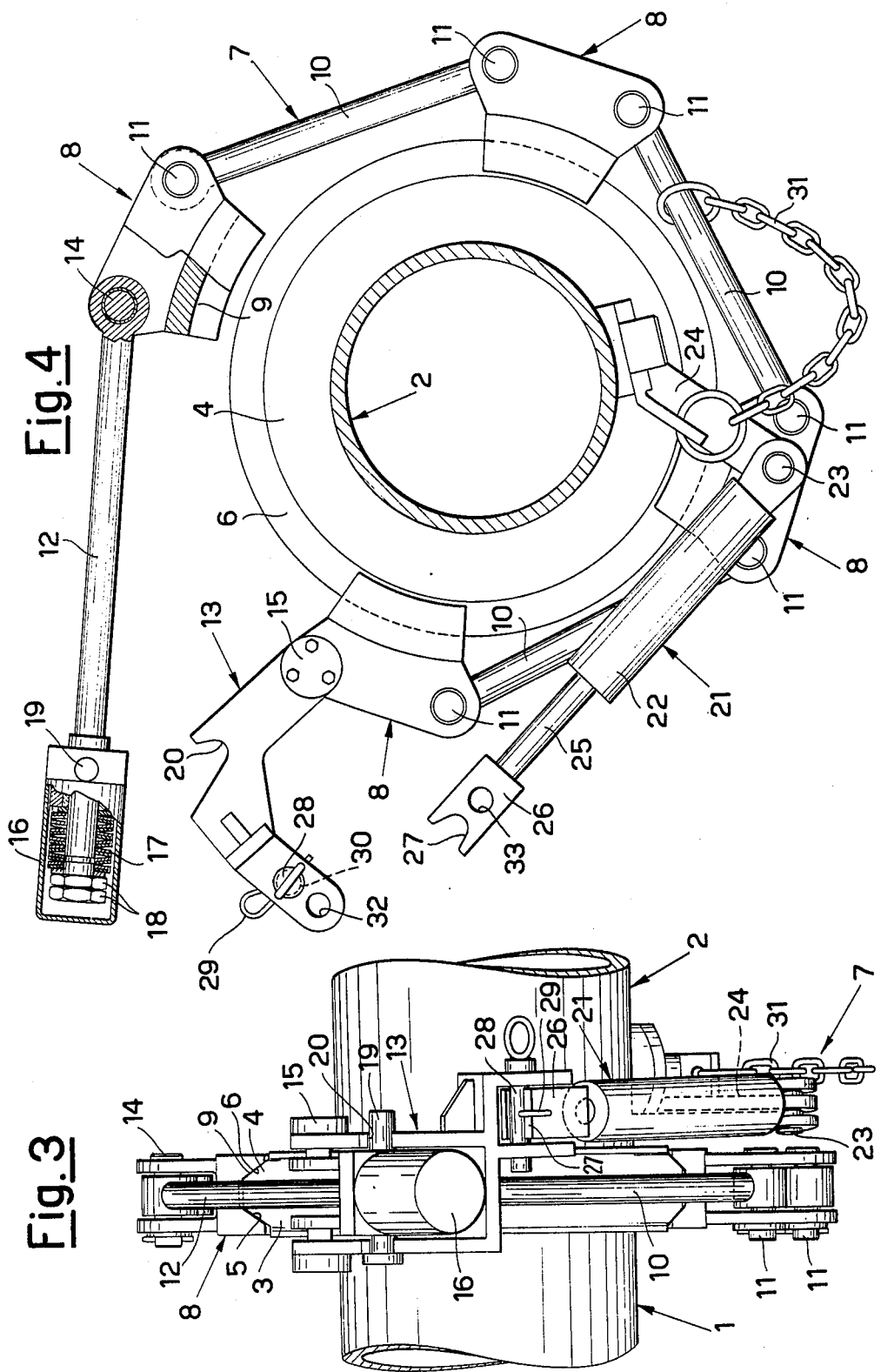

QUICK-RELEASE CONNECTING DEVICE FOR FLANGED HYDRAULIC COMPONENTS

This invention relates to a quick-release connection device for flanged hydraulic components, in particular pipes and valves for conveying low temperature liquid gases.

In many cases, especially when working under precarious conditions which can easily lead to emergencies, it is necessary to use connection devices for flanged hydraulic components which can be quickly and safely released in case of need. This occurs particularly in conveying liquid products from a ship to land and vice versa, possibly through a length of pipe floating in the sea.

The required quick release is particularly difficult to obtain when the product to be conveyed is a low temperature liquid gas, such as LNG (liquid natural gas), LPG (liquid propane gas), ethylene etc. In such a case, the extremely low operating temperature (down to −196° C.) means that a layer of ice forms on the outside of the pipes, valves or other hydraulic components used, and this prevents release.

The object of the present invention is to provide a quick-release connection device for flanged hydraulic components, which is able to operate with complete reliability both at ambient temperature and at very low temperature, and in the presence of ice.

According to the invention, this object is attained by a device comprising a plurality of tightening clamps which can be disposed to straddle a pair of mating flanges on the components to be connected, a plurality of connection rods hinged at their ends to respective pairs of clamps in such a manner as to form an articulated succession of clamps which can be disposed about said mating flanges in the form of a ring provided with an aperture between two end clamps of said succession, a further tightening rod hinged to one of said end clamps, a lever hinged to the other of said end clamps, releasable means for coupling said tightening rod to said lever for completing said ring about said mating flanges, means for controlling the movement of said tightening rod between a position in which the ring is open and in which the rod is released from said lever and is rotated towards the outside of the ring relative to the line joining the point at which said tightening rod engages with said lever and the point at which said lever is hinged to the relative clamp, and a position in which the ring is closed and tightened and in which said tightening rod is coupled to said lever and is rotated towards the inside of the ring relative to said joining line, and resilient means associated with said coupling means in such a manner as to favour the maintaining of said closed position as determined by said tightening rod while the axis of this latter is located inwards of said joining line, but to force it to move rapidly into its opening position when the axis of said tightening rod is moved outwards beyond said joining line.

In other words, the device according to the invention is based substantially on the appropriate utilisation of the resilient force which suitable resilient means normally exert in the closure direction, but are able to change such as to force the rapid release of the rod-lever coupling as soon as suitable control means have caused the tightening rod to exceed the dead point constituted by the line joining the point at which the tightening rod engages with the lever which cooperates with it, and the point at which it is hinged to the lever. The tightening rod is then forced to rotate rapidly towards its opening position, so that it becomes released from the lever and thus opens the tightening ring which had been previously formed about the mating flanges of the two connected hydraulic components.

These and further characteristics of the present invention will be more apparent from the detailed description given hereinafter of one embodiment thereof illustrated by way of example in the accompanying drawings, in which:

FIG. 1 is a front view of a device according to the invention in the closed position about the two mating flanges of two pipes;

FIG. 2 shows said device and said pipes in section on the line II—II of FIG. 1;

FIG. 3 is a side view of said device and said pipes seen from the left of FIG. 1;

FIG. 4 is a front view of said device, as in the case of FIG. 1, but in the open position.

The drawings show two pipes 1 and 2 provided with end flanges 3 and 4 having an oblique peripheral profile 5 and 6 (FIG. 2).

Said pipes 1 and 2 are connected together by a quick-release device 7, comprising a plurality of tightening clamps 8 with oblique walled recesses 9, which are disposed to straddle the mating flanges 3 and 4 in order to cause them to adhere closely to each other. The oblique profiles 5 and 6 of the flanges 3 and 4 cooperate for this purpose with the oblique walls of the recesses 9 in the clamps 8, to form a wedge engagement which favours maximum adherence between the flanges.

The clamps 8 are connected together in pairs by rods 10 hinged at 11 at their ends, so as to form an articulated succession of clamps which can be placed around the two flanges 3 and 4 in the form of a ring which can be alternately opened and closed.

Said ring is closed, in the manner shown in FIG. 1, by a further tightening rod 12 and a fork lever 13 hinged respectively at 14 and 15 to the end clamps of said succession of clamps 8. On that end of the rod 12 which is not hinged there is slidably mounted a cylinder 16 urged resiliently by a cup spring 17 disposed about the rod 12 and acting against stop nuts 18 fixed to the end of the rod (FIG. 4). From the two sides of the cylinder 16 there extends a pin 19, which is releasably housed in a double recess 20 in the lever 13 when the ring is in the closed position of FIG. 1. The position is such that the axis A of the rod 12 is on that side of the line B joining the engagement point between the rod 12 and lever 13 and the hinging point 15 on the lever which is towards the inside of the ring, so that the spring 17 keeps the connection device 7 in its closed position.

To open the device, a hydraulic cylinder 21 is provided, with its cylinder part 22 hinged at 23 to a bracket 24 which is rigid with the pipe 2, and the rod of its piston 25 provided with a head 26 with a recessed end 27. During the opening stage, a pin 28 inserted and locked by a split pin 29 in a double bore 30 of the lever 13 engages in said recessed end 27. When the cylinder 21 extends, it can thus cause the lever 13 to rotate initially until the point in which the axis A coincides with the axis B. At this point, the resilient force of the spring 17, which had been compressed until that moment, is released to force the lever 13 to rotate at a speed greater than that which would be otherwise allowed by the cylinder 21, so causing the pin 28 to emerge from the recessed end 27 of the head 26 of the rod 25, and thus release the lever 13 from its engagement with the cylinder 21, then causing the pin 19 to emerge from the recess 20 in the lever 13, and thus open the ring which had previously been tightened about the flanges 3 and 4 (FIG. 4). The succession of clamps 8 and rods 10 then opens completely; and remains connected to the pipe 2 only by means of a chain 31.

If required, a manual tool pivoted at 15 and arranged to engage with the lever 13 can be used instead of the cylinder 21, in order to allow the device to be opened manually.

For closure, the clamps 8 are disposed straddling the flanges 3 and 4, and the rod 12 is coupled manually to the lever 13 by inserting the pin 19 into the recess 20, after which the pin 28 is manually inserted into corresponding bores 32 and 33 in the lever 13 and the head 26 of the cylinder 21, removing it from the bore 30. The cylinder 21 is then shortened until the axis A is returned to the inside of the axis B as shown in FIG. 1.

What we claim is:

1. A quick-release connection device for hydraulic components provided with mating terminal flanges, comprising a plurality of tightening clamps which can be disposed to straddle a pair of mating flanges on the components to be connected, a plurality of connection rods hinged at their ends to respective pairs of clamps in such a manner as to form an articulated succession of clamps which can be disposed about said mating flanges in the form of a ring provided with an aperture between two end clamps of said succession, a further tightening rod hinged to one of said end clamps, a lever hinged to the other of said end clamps, releasable means for coupling said tightening rod to said lever for completing said ring about said mating flanges, means for controlling the movement of said tightening rod between a position in which the ring is open and in which the rod is released from said lever and is rotated towards the outside of the ring relative to the line joining the point at which said tightening rod engages with said lever and the point at which said lever is hinged to the relative clamp, and a position in which the ring is closed and tightened and in which said tightening rod is coupled to said lever and is rotated towards the inside of the ring relative to said joining line, and resilient means associated with said coupling means in such a manner as to favour the maintaining of said closed position as determined by said tightening rod while the axis of this latter is located inwards of said joining line, but to force it to move rapidly into its opening position when the axis of said tightening rod is moved outwards beyond said joining line.

2. A device as claimed in claim 1, wherein said resilient means are constituted by spring elements housed in a small cylinder slidably mounted on said tightening rod, said coupling means being constituted by a pin projecting transversely from said small cylinder and housable in a recess in said lever.

3. A device as claimed in claim 2, wherein said control means are constituted by a hydraulic cylinder with a rod provided with a head which can be engaged with said lever in such a manner that during the opening stage said lever is thrust by said cylinder until the moment in which the axis of the tightening rod exceeds the dead point constituted by said joining line, and is then left free to rotate independently of said cylinder under the thrust of said resilient means, while during the closure stage it is dragged by said cylinder until the closed position is reached.

* * * * *